(12) United States Patent
Jagannathan

(10) Patent No.: US 9,356,821 B1
(45) Date of Patent: May 31, 2016

(54) STREAMING CONTENT DELIVERY SYSTEM AND METHOD

(75) Inventor: Vijayaraghavan Jagannathan, Emoryville, CA (US)

(73) Assignee: TATA COMMUNICATIONS (AMERICA) INC., Herndon, VA (US)

( * ) Notice: Subject to any disclaimer, the term of this patent is extended or adjusted under 35 U.S.C. 154(b) by 218 days.

(21) Appl. No.: 13/569,812

(22) Filed: Aug. 8, 2012

(51) Int. Cl.
*G06F 15/173* (2006.01)
*H04L 29/08* (2006.01)
*H04L 29/06* (2006.01)

(52) U.S. Cl.
CPC .......... *H04L 29/08144* (2013.01); *H04L 29/06* (2013.01)

(58) Field of Classification Search
CPC ................................. G06F 15/16; H04H 60/09
USPC ................................................ 709/231, 232
See application file for complete search history.

(56) References Cited

U.S. PATENT DOCUMENTS

| 7,797,426 | B1 | 9/2010 | Lyon | |
|---|---|---|---|---|
| 7,818,355 | B2 | 10/2010 | Mills et al. | |
| 2004/0083273 | A1* | 4/2004 | Madison et al. | 709/217 |
| 2011/0173345 | A1* | 7/2011 | Knox et al. | 709/246 |
| 2011/0252082 | A1* | 10/2011 | Cobb et al. | 709/203 |
| 2012/0278619 | A1* | 11/2012 | Tam | 713/168 |

* cited by examiner

*Primary Examiner* — David Lazaro
*Assistant Examiner* — Zia Khurshid
(74) *Attorney, Agent, or Firm* — Hubbs, Enatsky & Inoue PLLC

(57) ABSTRACT

A method of providing media content from a server to a client device, by providing a URL which allows access to media content by client the device, receiving a request from the client device for the media content corresponding to the single URL; determining an operating system of the client device requesting the media content; selecting a delivery protocol to stream to the client device based on the determined operating system; and providing said client device a streaming media file based on the selected delivery protocol, wherein the determination of the operating system of the client device includes parsing a user-agent string of the client device making the request.

18 Claims, 7 Drawing Sheets

US 9,356,821 B1

STREAMING CONTENT DELIVERY SYSTEM AND METHOD

BACKGROUND

The following description sets forth the inventor's knowledge of related art and problems therein and should not be construed as an admission of knowledge in the prior art.

The use of mobile devices, including smart-phones and tablets is increasing tremendously and impacting the way content providers provide content, specifically streaming content. Streaming content typically represents information that must be delivered in real time. This information could be, for example, video, audio, slide show, web tour, combinations of these, or any other real time application. (Examples of types of media files include: Moving Picture Experts Group (MPEG), Quicktime video files, WINDOWS Media Video (WMV), Audio Video Interleave (AVI), etc. Audio files include MPEG-4, WAV, MP3, etc. Examples of image file formats include: JPEG, GIF, BMP, TIFF, etc.).

Many different types of devices are capable of receiving streaming content (e.g., a desktop computer, IPHONE, BLACKBERRY, NOKIA, ANDROID phones, etc.). Each of these different types of devices could include a different media player and a different protocol for receiving streaming content. More and more people are using mobile devices to receive streaming content, such as live events (e.g., sporting events and television shows), and pre-recorded video/audio programs. The streaming content is typically stored or buffered on a server connected to a network, e.g. the Internet. Upon receiving a request, the server delivers the requested streaming content to the mobile device. However, the wide variety of types of mobile devices, media players, and protocols can result in undelivered content and lower the overall user experience.

SUMMARY

The streaming content delivery method and apparatus of the present application provides a faster and more efficient method of streaming a media file to a requesting client device. In accordance with one embodiment, a server can determine what type of device is making the request, determine a specific media file and delivery protocol for the requesting device, and provide the specific media file using the chosen delivery protocol to the requesting device. Further, the server can also serve a multi-bitrate playlist file to the client device, or create a multi-bitrate playlist file to serve to the client device.

In one example, a requesting client device is a mobile device. The mobile device can operate using one of a variety of operating systems, with each type of operating system having different requirements and capabilities. Further, each type of operating system can include one or more types of media players, with each type of media player having different requirements and capabilities.

In this example, a server determines the type of device requesting the streaming media file, selects the appropriate streaming media file for the requesting client device, and provides the selected media file to the requesting mobile device, based on, for example, a user-agents string. A user-agent string can identify the web browser and certain system details related to the mobile device. A user-agent string can be located in the request for a web-page from a client device, for example.

Thus, the user of a mobile device (e.g., or other device requesting a streaming media file) can efficiently and effectively receive the desired media content without having to further select the appropriate type of media file to download. Essentially, a user can click on a single URL and have the appropriate streaming media file delivered to the user's mobile device without taking any further action.

A server can offer a single URL to any requesting device and can accordingly provide an appropriate media file specific to said requesting device based on that device's request.

In one embodiment, a method of providing a media file to a client device includes the server providing a URL which allows access to media content by the client device, the server receiving a request from the client device for the media content corresponding to the single URL, the server determining an operating system of the client device requesting the media content, the server selecting a media content protocol to stream to the client device based on the determined operating system, and the server providing said client device a streaming media file based on the selected media content protocol, wherein the determination of the operating system of the client device includes parsing a user-agent string of the client device making the request.

BRIEF DESCRIPTION OF DRAWINGS

The advantages of the invention will become apparent in the following description taken in conjunction with the drawings, wherein.

DETAILED DESCRIPTION OF DRAWINGS

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

Figure 1:
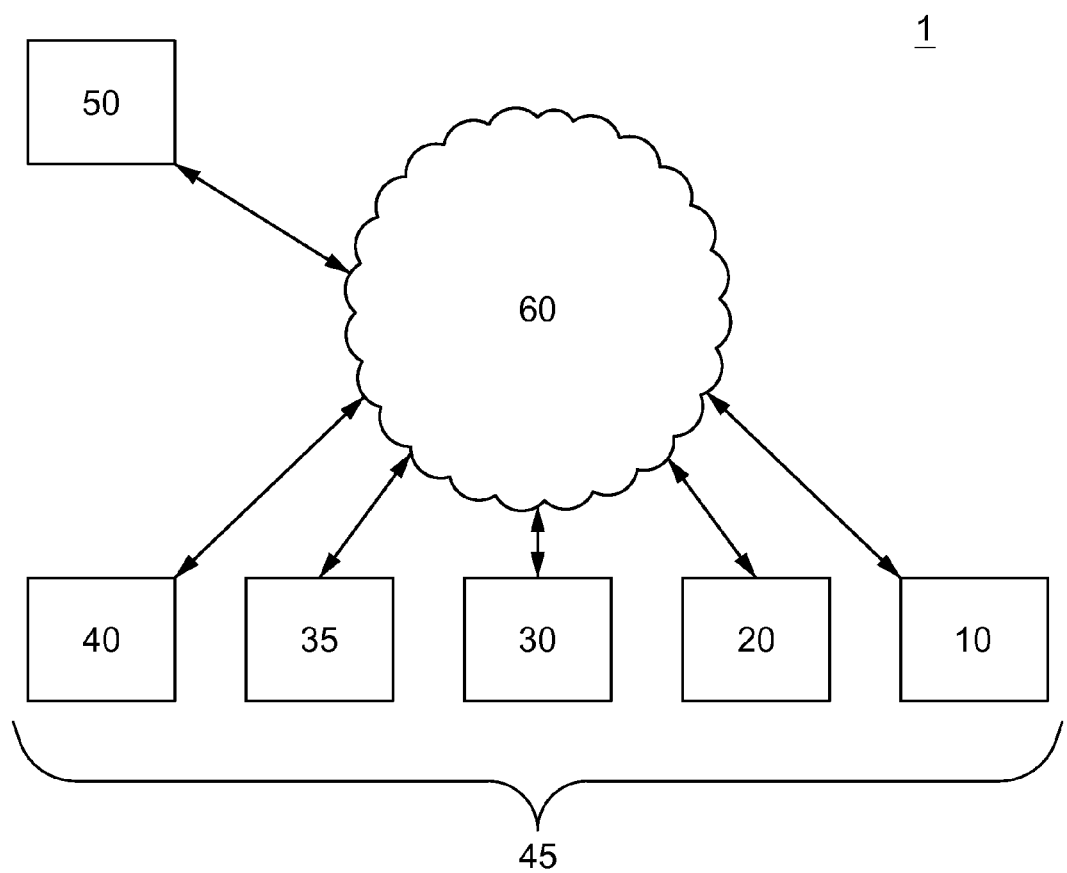
FIG. 1 illustrates a system of interconnected devices of a content delivery system according to one embodiment.

FIG. 1 shows an example of a configuration of a content delivery determination system that determines the appropriate media file protocol to make available to a requesting client, based on the type of requesting client.

For example, FIG. 1 shows four mobile devices, 10, 20, 30, 35 and a desktop unit 40. These devices may also be referred to, individually or collectively, as client devices 45. Each device can communicate with network 60 (e.g., Internet, etc.). Each of the client devices 45 may contain different hardware and software components.

For example, mobile device 10 may be a mobile phone which runs on an ANDROID platform. ANDROID is a specific type of operating system and is commonly used as a mobile phone platform. Mobile device 20 may be an IPHONE using a proprietary operating system such as iOS® (IPHONE OPERATING SYSTEM). Mobile device 30 may be a mobile phone which uses its own proprietary operating system, such as WINDOWS PHONE 8, for example. Mobile device 35 may be a laptop computer running WINDOWS based operating system, LINUX based operating system, etc. Desktop 40 may be a personal computer using a WINDOWS based operating system, LINUX based operating system, etc. However, any suitable operating system can be used.

Thus each client device 45 could have a different operating system, different media player(s), different protocol requirements, etc. When a client device 45 requests content from server 50 (e.g. a streaming server), server 50 may need to tailor each response to each unique client request in order to deliver the appropriate file (e.g., to improve the user's viewing experience). This aspect will be explained in further detail below.

For example, if the mobile device 20 is an IPHONE using an iOS® platform, then the mobile device 20 is capable of playing media using an HLS (HTTP Live Streaming) protocol, which is a capability native to the operating system. However, the mobile device 20 may not be capable of playing media files using other protocols. As such, it is important that server 50 be able to deliver the media content in a protocol which is capable of being used by the specific mobile device. This feature will be explained in more detail below.

Figure 2:
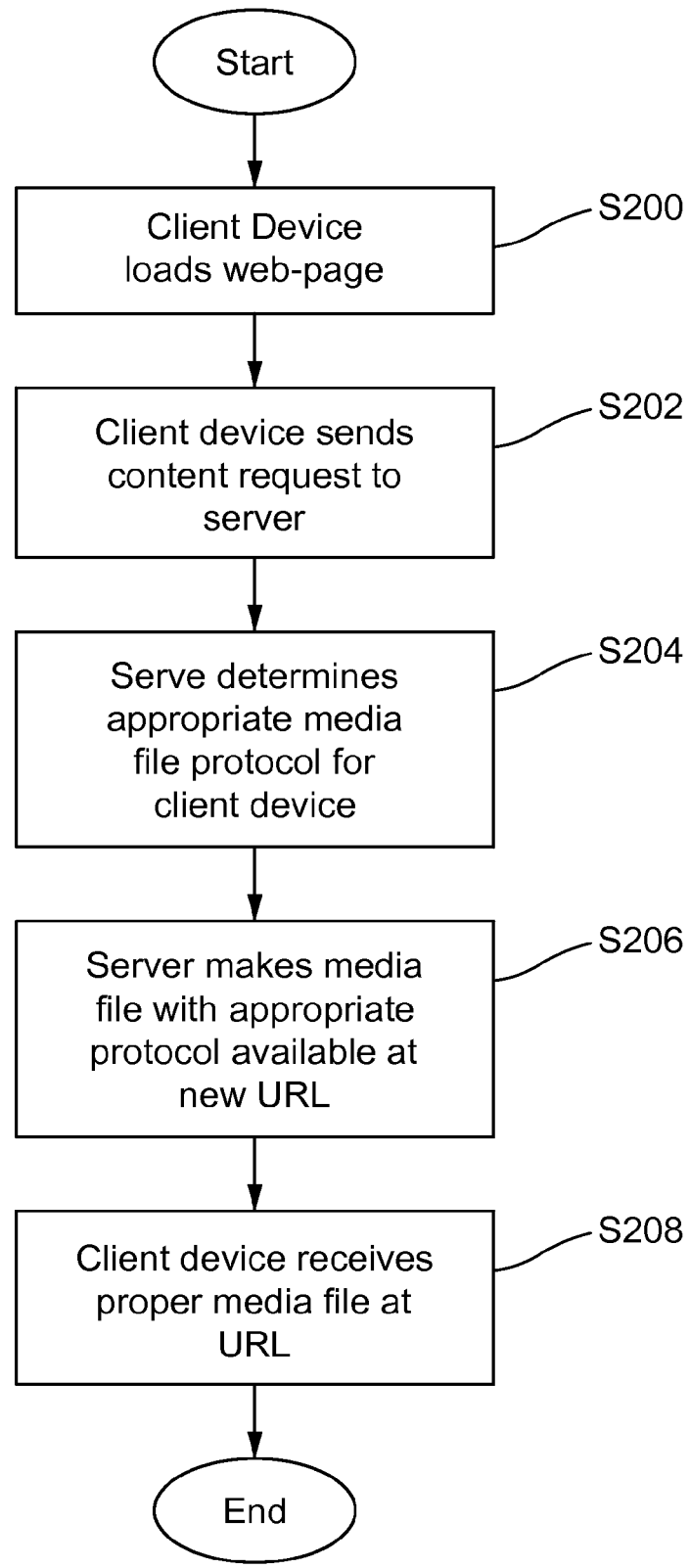
FIG. 2 illustrates a flowchart showing an example of an operation of a content delivery system according to one embodiment.

FIG. 2 shows a flowchart of the server operation when client device 45 requests media content. In this example, the user of a mobile device 10 desires to view streaming media content over the Internet.

At step S200 the client device 45 loads a webpage. The webpage contains a URL which links to media content. The URL provided on the webpage is the same URL provided for any client device (e.g. does not change based on the type of client device making the request, such as desktop computer, IPHONE, BLACKBERRY, NOKIA, ANDROID phones, etc.)

At step S202 a webpage containing a universal URL is loaded by the client device 45. The embedded URL causes the client device 45 to request streaming video/audio media content, etc. from server 50. Alternatively, a webpage containing a URL could be loaded by client device 45 and a user could click on the universal URL to request media content from server 50. The media content may be saved locally within the server 50, or may be saved on a different server (not shown) connected to the network 60.

The URL link clicked by the user can be a generic single URL link that is provided to all client devices 45 (e.g. a universal URL). That is, the link clicked by the user need not be tailored to the specific type of client device requesting the media content. Further, the user does not have to indicate the specific type of client device 45 being used or click on a link tailored to the specific type of client device 45 being used. Instead, by clicking a single link, regardless of the type of client device 45 being used, the client device 45 can receive the appropriate media file formatted in the appropriate protocol.

Further in one embodiment, the method of providing content to a requesting client device 45, such as a universal URL discussed above, could be combined with the system of managing a content request at a content delivery network discussed in U.S. Pat. No. 7,797,426, and patented on Sep. 14, 2010. This patent is incorporated by reference in its entirety. However it should be appreciated that other suitable methods of managing the content request at a content delivery network can also be used.

The media file may be saved on the server 50 in a single format, or in a plurality of formats. Further, the media file may be saved in different bitrates (e.g. a high quality bitrate, low quality bitrate, medium quality bitrate, etc.). The media file format(s) may include, but are not limited to: Moving Picture Experts Group (MPEG), Quicktime video files, MPEG-4, MP3, AVI, WMV, etc.

At step S204, after receiving a request for content, the server 50 selects a media file protocol to make available to the client device 45. For example, while the client device 45 may be able to receive and play a plurality of different types of media files, server 50 selects one (e.g., most appropriate) media file protocol to provide to the client device 45. The details of how the media file protocol is selected and provided to the client device 45 are discussed further in FIGS. 3 and 4.

At step S206, after server 50 selects the media file protocol to provide to the client device 45 in step S204, the server 50, for example, creates a protocol specific URL (uniform resource locator) and makes the media content available for download at the URL, in the appropriate media file protocol.

The media file can also be transcoded from a pre-existing file or can be previously stored in memory. Further, the appropriate media file can proxied from another server and made available on the server 50.

At step S208, after the selected media file(s) is made available, for example at the specified URL, the client device 45 is automatically directed to the specified URL and the file can be downloaded and streamed to the client device 45.

Figure 3:
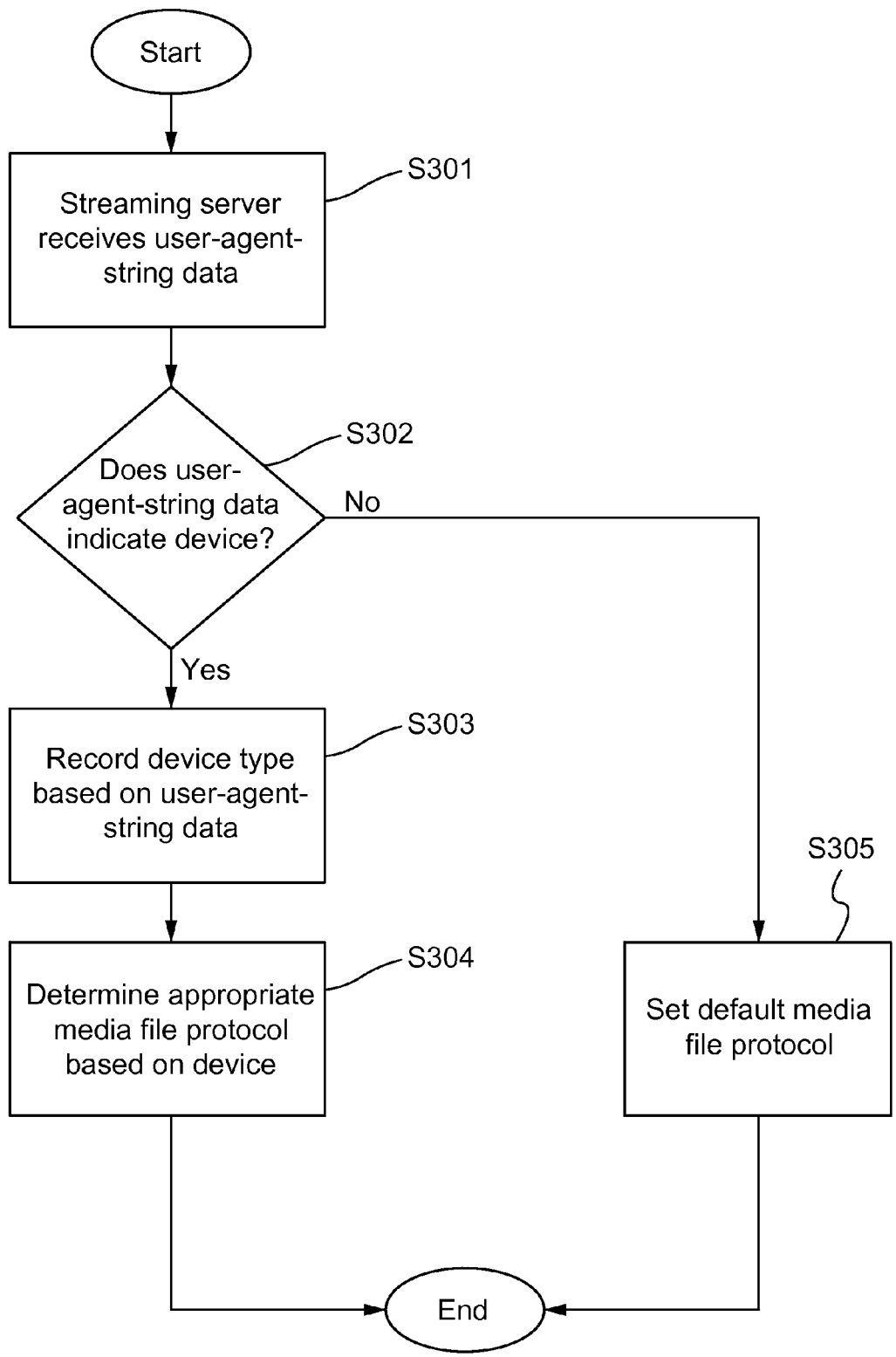
FIG. 3 illustrates a flowchart showing an example of the operation of determining an appropriate media file of the content delivery system according to one embodiment.

FIG. 3 shows an example of how a media file protocol can be selected for each client device 45. Steps S302 to S305 can all occur within step S204, for example, discussed above with respect to FIG. 2.

At step S301, when requesting media content, the client device 45 transmits a content request including, for example, the agent-string data to the server 50. This user-agent-string data contains information that can be parsed, allowing at least the type of client device 45 (e.g. the operating system and associated hardware) requesting the media content to be identified by the server 50.

As an example, user-agent string data can look like the information shown in the following lines of code:

Mozilla/5.0(iPhone; CPU iPhone OS 5_0 like Mac OS X) AppleWebKit/534.46

(KHTML, like Gecko) Version/5.1Mobile/9A334Safari/7534.48.3

In this example, the user-agent string data indicates that the type of client device 45 is an iPhone® using operating system version 5.0.

At step S302, once the server 50 receives the user-agent string data, the data can be parsed to determine if it indicates the type of device being used (e.g., hardware and software). If the user-agent string data indicates the type of device being used, then the server 50 proceeds to step S303. However, if the user-agent string data does not indicate the type of device that is making the request, then the server 50 proceeds to step S305.

For example, if the mobile device 20 is running on an iOS® platform, then in the request for media content, an indication of which kind of device is making the request will be available in the user-agent string data. Based on the device making the request, it can be determined which operating system is being used by the mobile device 10. Thus, if the user-agent string data indicates that an IPHONE is being used, then it can be determined that the client device is using an iOS® platform.

Further, based on the operating system being used, it can be determined what type of media file protocol is supported by the native media player associated with the client device 45.

For example if iOS® is being used by a mobile device, then an HLS protocol is supported by the client device 45.

In another embodiment, the type of web-browser being used by the client device 45 can also indicate what type of device it is. For example, if the client device 45 is using INTERNET EXPLORER as a web browser, then the client device 45 is most likely a desktop 40 or laptop computer. If a client device 45 is using GOOGLE CHROME MOBILE, then the client device 45 is most likely to be an ANDROID mobile device. If a client device 45 is using SAFARI, then the client device 45 is most likely to be an IPHONE mobile device. If a client device 45 is using INTERNET EXPLORER MOBILE, then the client device 45 is most likely to be a WINDOWS PHONE mobile device.

If, as shown in step S305, the server 50 cannot determine the type of operating system of client device 45, the server 50 selects a default protocol in which the media content will be provided to the client device 45. This default media file protocol could be a protocol that is compatible with many devices. However, providing a one-size-fits-all protocol to a client device 45 may result in a less than optimal viewing experience for the user.

For example, the default media file protocol may have a lower encoded bitrate to ensure that the broadest possible number of devices can view the file. This may result in a lower image quality displayed to the user.

If the user-agent string data indicates the type of device being used, then the type of client device 45 (e.g., including if applicable, an operating system and version of client device 45) can be recorded based on this information in step S303. Based on the type of client device 45 that is requesting the media content, it can be determined what type(s) of protocol(s) the client device 45 supports.

For example, if the client device 45 is an IPHONE, the client device 45 can play a media file with an HLS (Apple® HTTP Live Streaming) protocol via the HTML5 (hypertext markup language) video tag. If the client device 45 is an ANDROID device, then the client device 45 can play a media file with an RTSP (real time streaming protocol) protocol or HTTP/RTMP (Real Time Messaging Protocol) protocol using FLASH, depending on the version of the ANDROID platform. For example, ANDROID versions 2.1 or less do not support FLASH, and ANDROID versions 2.2 or greater do support FLASH. Therefore, the server 50 may make a FLASH based media file available to a client device 45 which uses an ANDROID platform.

An additional determination can be made when determining the appropriate streaming media file protocol for an ANDROID mobile device, or other device, in step S303. Specifically, if the server 50 determines that the client device 45 is using an ANDROID platform, then the server 50 may also further determine what version of the ANDROID platform is being used in order to determine the most appropriate media file protocol for the client device 45.

That is, each device type may support different media file protocols depending on which version of their operating system it is running. In some cases, for example when a change occurs between native media file protocols accepted by a new version of an operating system, the server 50 can determine which version of the operating system is being run by the client device 45. Thus, server 50 can use this information to determine the appropriate media file protocol for the specific version of the operating system being used by client device 45.

Figure 4:
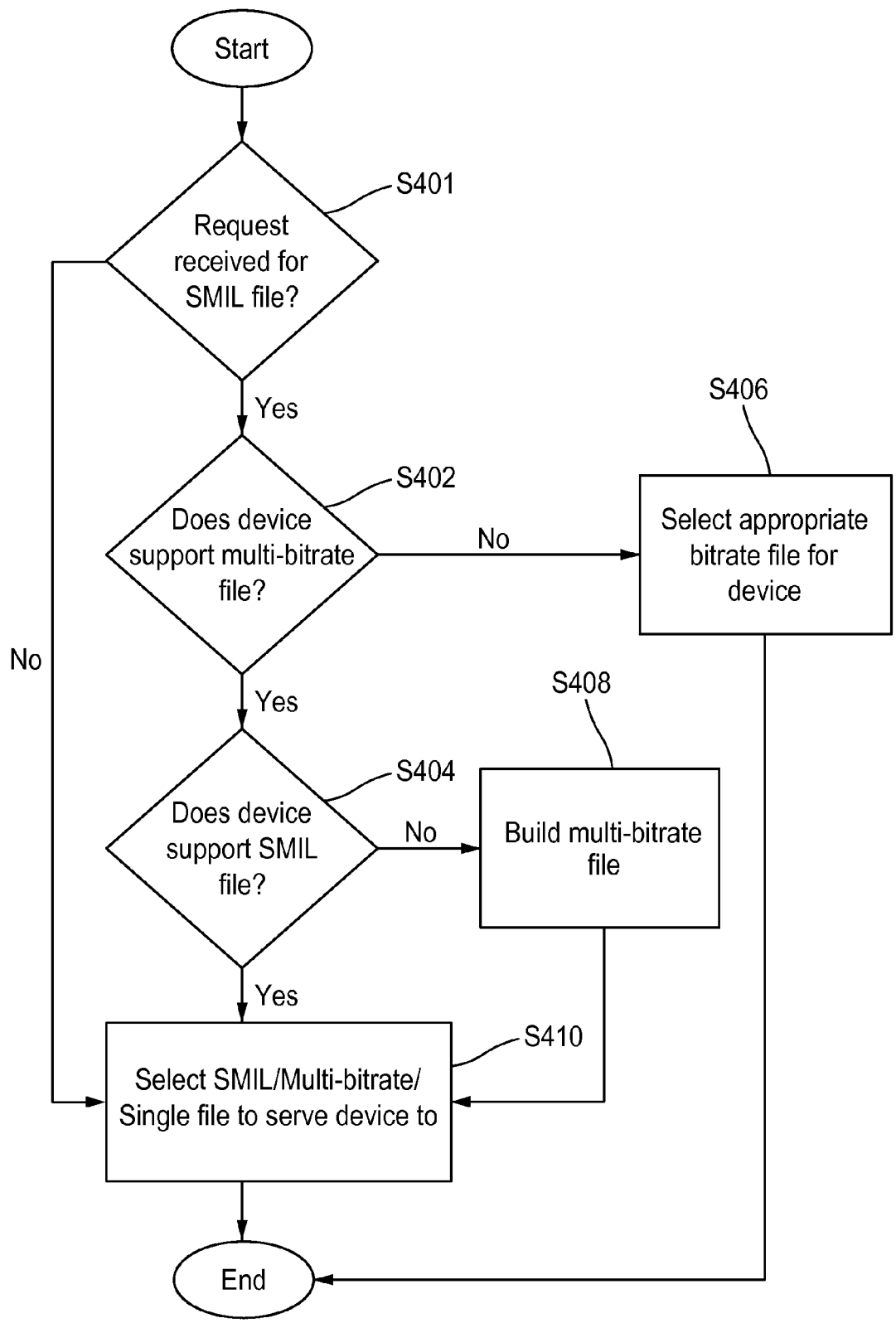
FIG. 4 illustrates a flowchart showing an example of the operation of determining an appropriate bit rate of a media file according to one embodiment of the content delivery system.

FIG. 4 shows the operation of the server 50 determining the appropriate file format (e.g., single bitrate or multi-bitrate) to provide to the client device 45. This process may occur after steps S304 or S305 as shown in FIG. 3. Once the type of media file protocol to provide to the client device is determined, the server 50, for example, may determine the appropriate single bitrate/multi-bitrate file to provide to the client device 45.

For example, depending on the network connection speed of the client device 45, a high, medium, or low bitrate media file may be desired. That is, if the network connection speed is slow, then a low bitrate file, such as for example, 300 Kb/s or less may be desired. Alternatively, if the speed of the client device's network connection is fast, then a high bitrate file, such as for example, 2 Mb/s may be desired.

At step S401, the server 50 determines if a requested file received from the client device 45 is a SMIL file (or a multi-bitrate file). If the requested file is a SMIL file, then the server 50 proceeds to step S402. If server 50 determines that the requested file is not a SMIL file (or a multi-bitrate file), then server 50 selects the requested file (e.g., a single bitrate file) for the client device in step S410.

At step S402 the server 50 determines whether the client device 45 can support a multi-bitrate file (e.g., this type of file improves a user's experience by delivering content with the resolution and bit rate that best matches the mobile device's connection speed). More specifically, the server 50 determines whether the media file protocol of the client device 45 can support a multi-bitrate file.

If the client device 45 (or media file protocol) cannot support a multi-bitrate file, then the server 50 can make an appropriate determination for the bitrate supplied to the client device 45 in step S406. For example, in order to allow a wide variety of client devices to view the media file, the server 50 may provide said media file at a low bitrate. However, the server can provide the appropriate media file using any default or pre-programmed bitrate desired.

In one embodiment, in step S406 the server 50 determines the appropriate bitrate file based on the type of communication protocol determined in steps S304 or S305. The appropriate bitrate file may be predetermined based on the type of communication protocol, or it may be selected by using an algorithm based on an accumulated history of data for communication using the selection communication protocol, for example.

In another embodiment, the appropriate bitrate file may be selected by the server 50 based on the bandwidth of the network connection of the client device 45. If the client device 45 has a high bandwidth, then a file with a higher bitrate file may be selected, for example. If the client device 45 has a low bandwidth, then a lower bitrate file may be selected.

In one embodiment, the server 50 determines the appropriate bitrate file based on the device requesting the file. In this embodiment, the server 50 will parse out each of the available files & bitrates that are available for download from the SMIL file (or a file and/or database that includes all of the available bitrates for a requested content). The server 50 may determine the type of device and a maximum available (or optimal) bitrate that the device can handle. Server 50 may compare the maximum available bitrate for the requesting client to available bitrate files. If an available bitrate file (e.g., from the SMIL file) for the requested content is less than or equal to the maximum available bitrate for the requesting device, server 50 may provide the bitrate file associated with the requested content that is largest bitrate file that is less than or equal to the maximum available bitrate for the requesting device. Alternatively, any one of the lower bitrate files associated with the requested content may be provided to the requesting device.

In each of the above embodiments, the server 50 can parse an SMIL file to determine the available bitrate files to serve to the client device 45, for example. At step S404, if the server 50 has determined that the client device 45 (or media file protocol) can support a multi-bitrate file, then the server 50 determines whether the client device 45 can support an SMIL (synchronized multimedia integration language). An SMIL file is a widely used file that allows a media player to stream a media file at different bit rates. Thus, a media player may choose to stream a lower bitrate version of the file if the connection speed between the client device 45 and the server 50 is slow. Likewise, the media player may choose to switch to a higher bitrate version of the file if the connection speed between the media player and server 50 is fast. Further, the media player can choose to change the bitrate version of the file at any time.

At step S410, if the server 50 has determined that the client device 45 (or media file protocol) supports SMIL files, then the server 50 serves, or makes available, the SMIL file to the client device 45. By providing the SMIL file to the client device 45, for example, the client device 45 can choose the appropriate bit rate of media file to download.

For example, the SMIL file can contain 3 different media file bitrates; a high bitrate file, a medium bitrate file and a low bitrate file. When the client device 45 is served the SMIL file, it can choose the appropriate file to download, depending on the factors discussed above. Further, the client device can dynamically switch bitrate files while playing the media file if the client device 45 determines that a different bitrate file is more appropriate. For example, the connection speed of a mobile device 10 may increase, thus affording the mobile device 10 an opportunity to download a higher quality media file, i.e. a higher bitrate file. Alternatively, the connection speed of a mobile device 10 may decrease, thus causing the mobile device 10 to download a lower quality media file; i.e. a lower bitrate file.

At step S408, if the server 50 has determined that the client device 45 does not support an SMIL file in step S404, then the server 50 builds a multi-bitrate playlist using the SMIL file, for example. The multi-bitrate playlist can be used by the client device 45 to select the appropriate media file bit-rate to download. The multi-bitrate playlist can act in a similar fashion to the SMIL file.

For example, the SMIL file could contain 3 different media file bitrates; a high bitrate file, a medium bitrate file and a low bitrate file. When the multi-bitrate playlist is being constructed for the specific type of media file protocol, three files could be created for the playlist; a high bitrate file, a medium bitrate file and a low bitrate file, for example.

Once the multi-bitrate playlist has been created by the server 50, the multi-bitrate playlist is served or made available to the client device 45 in step S410. When the multi-bitrate playlist is served to the client device 45, the client device 45 can select the appropriate bitrate media file to download.

Figure 5:
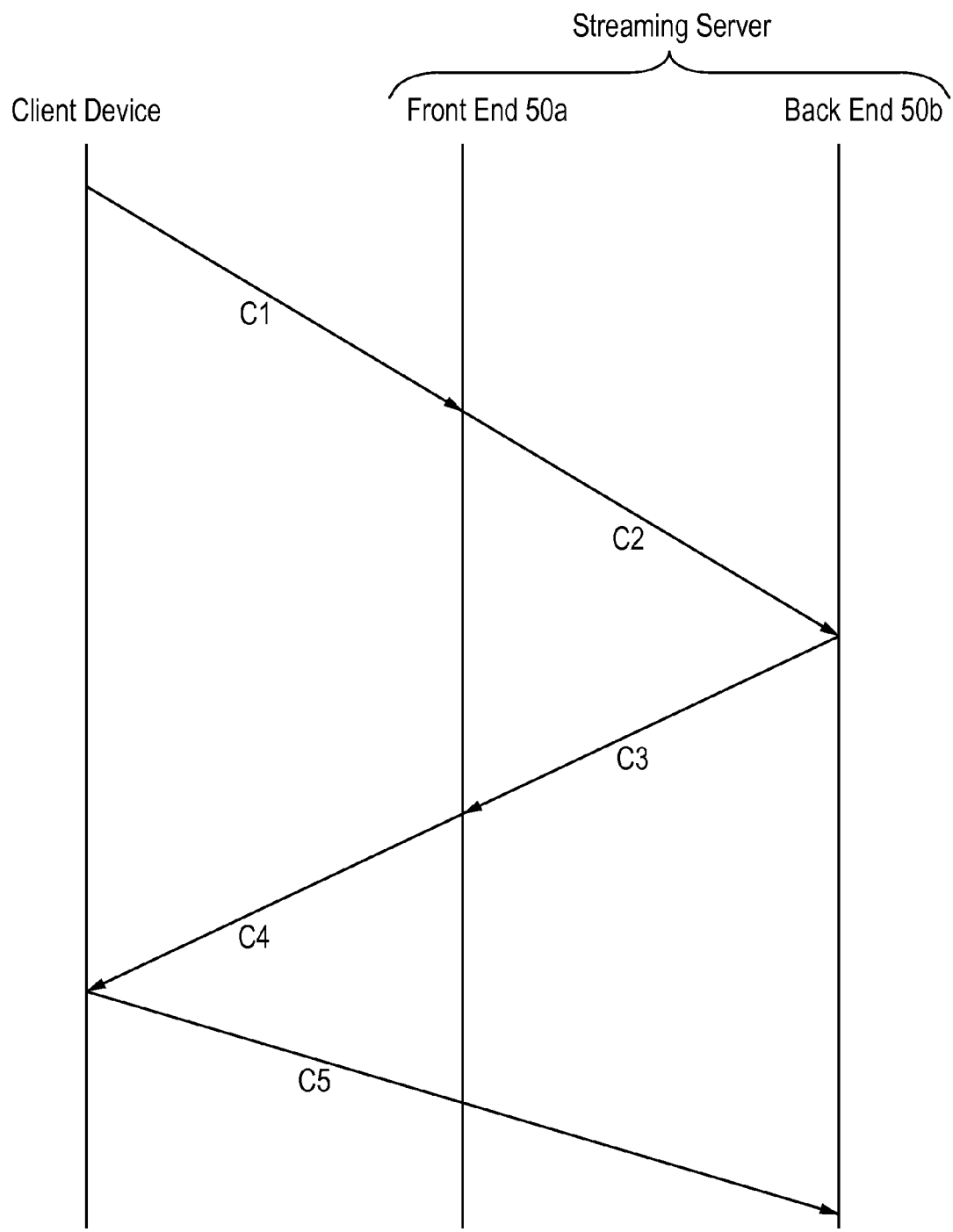
FIG. 5 illustrates a communication chart according to one embodiment of the content delivery system.

FIG. 5 is a communication chart showing communication between a client device 45 and a server 50. In FIG. 5, server 50 is divided into two separate sections for illustrations purposes, a front end 50*a* and a back end 50*b*. Front end 50*a* could be an HTTP front end and back end 50*b* could be a server back end. Server 50 can be a single server, or could be a combination of servers. For example in another embodiment, front end 50*a* could be a unique server and back end 50*b* could be a unique server.

As shown in FIG. 5, time is shown progressing in a vertical manner as the operations and communications proceed down the page. The process begins when a user clicks a link, for example, and directs the client device 45 to download/stream media content. The user may wish to stream the media content, or may wish to save it locally to client device 45. Once the client device 45 has been instructed to retrieve media content, the client device sends a request C1 to the server front end 50*a*. The request C1 from the client device 45 specifies the media content to be downloaded.

Upon receiving the request C1 from the client device 45, the front end 50*a* communicates with the back end 50*b* to determine whether the desired media content exists in communication C2. This request could be made to a CPU for example.

Upon receiving the communication C2, the back end 50*b* can indicate the existence or not of the file in communication C3. As shown in the example of FIG. 5, the back end 50*b* indicates that the file exists.

Once it is determined that the media content desired by the client device 45 is available, the front end then analyzes the user-agent string to determine the type of client device 45. Please see the discussion above for an example of how this is accomplished.

In communication C4, the front end 50*a* provides a protocol specific URL to the requesting client device 45. The client device then selects or is directed to the appropriate media content file and begins to download/stream the file in communication C5 from the back end of server 50*b*.

As discussed previously, the user-agent string is contained within the request for the media file by the client device 45. The user-agent string can contain information which identifies the type of device being used, for example.

Figure 6:
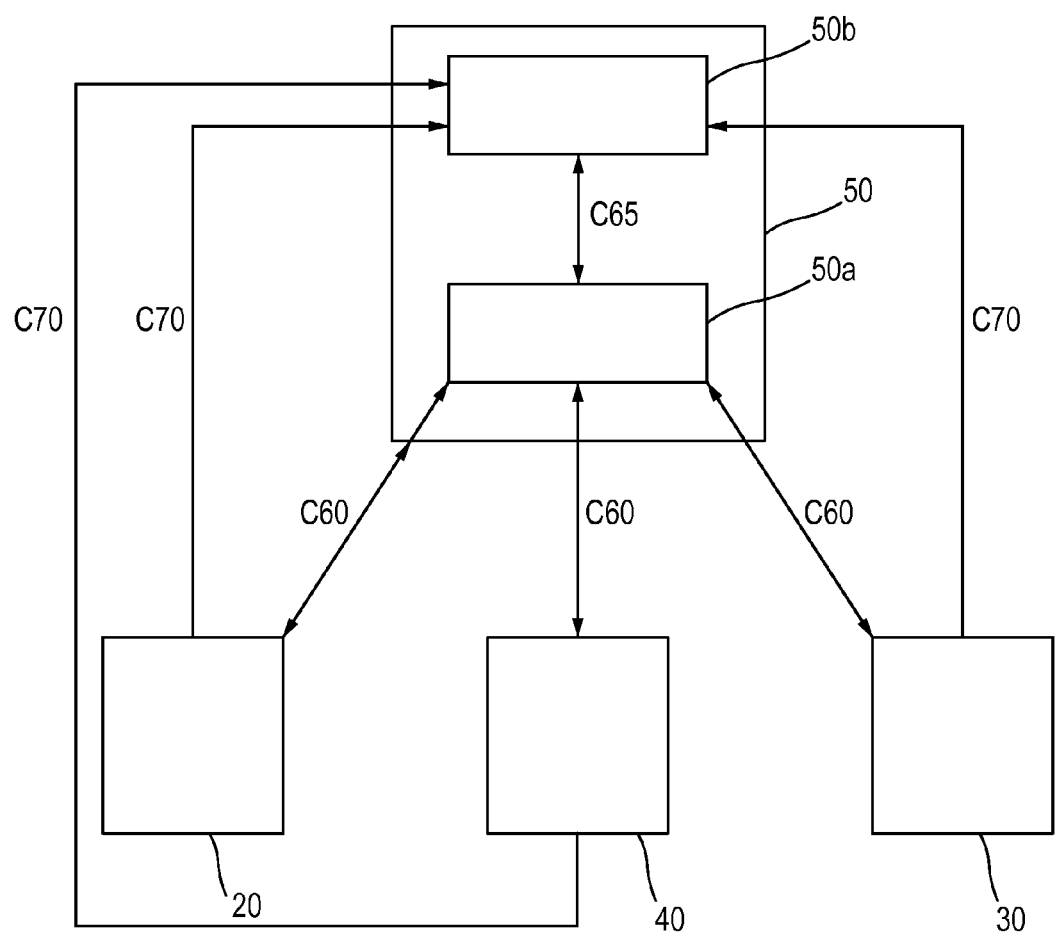
FIG. 6 illustrates a communication chart according to one embodiment of the content delivery system.

FIG. 6 shows an example of how the client devices 45 can communicate with the server 50 and how the front end 50*a* of the server communicates with the backend 50*b* of the server.

As shown in FIG. 6, a plurality of client devices 45 can make a request for media content from server 50. In the example shown in FIG. 6, mobile device 20 supports HLS, mobile device 30 supports RTSP and devices 40 support FLASH.

A webpage containing a universal URL is loaded by the client device 45. The embedded URL causes the client device 45 to request streaming video/audio media content, etc. from server 50. Alternatively, a webpage containing a URL could be loaded by client device 45 and a user could click on the universal URL to request media content from server 50. The type of requesting client device 45 is later determined by the server 50 and the client device 45 is then redirected to an appropriate URL which contains the specific media file and correct protocol for the client device 45 to download.

In communication C60, the client device 45 sends a media content request to server 50. The front end 50*a* of server 50 receives the requests and checks with back end 50*b* to determine if the desired content is available in communication C65.

The front end 50*a* (e.g. HTTP front end) can then use the user-agent string to determine the device type and generate a device specific URL in which the appropriate media file can be delivered to the client device 45. In step C70 the client device 45 is redirected to the new URL and the media file can begin to be downloaded.

In the present instance shown in FIG. 6, mobile device 20 is directed to a media file protocol that uses HLS. Mobile device 30 is directed to a media file protocol that uses RTSP and devices 40 are directed to a media file protocol that uses FLASH.

Figure 7:
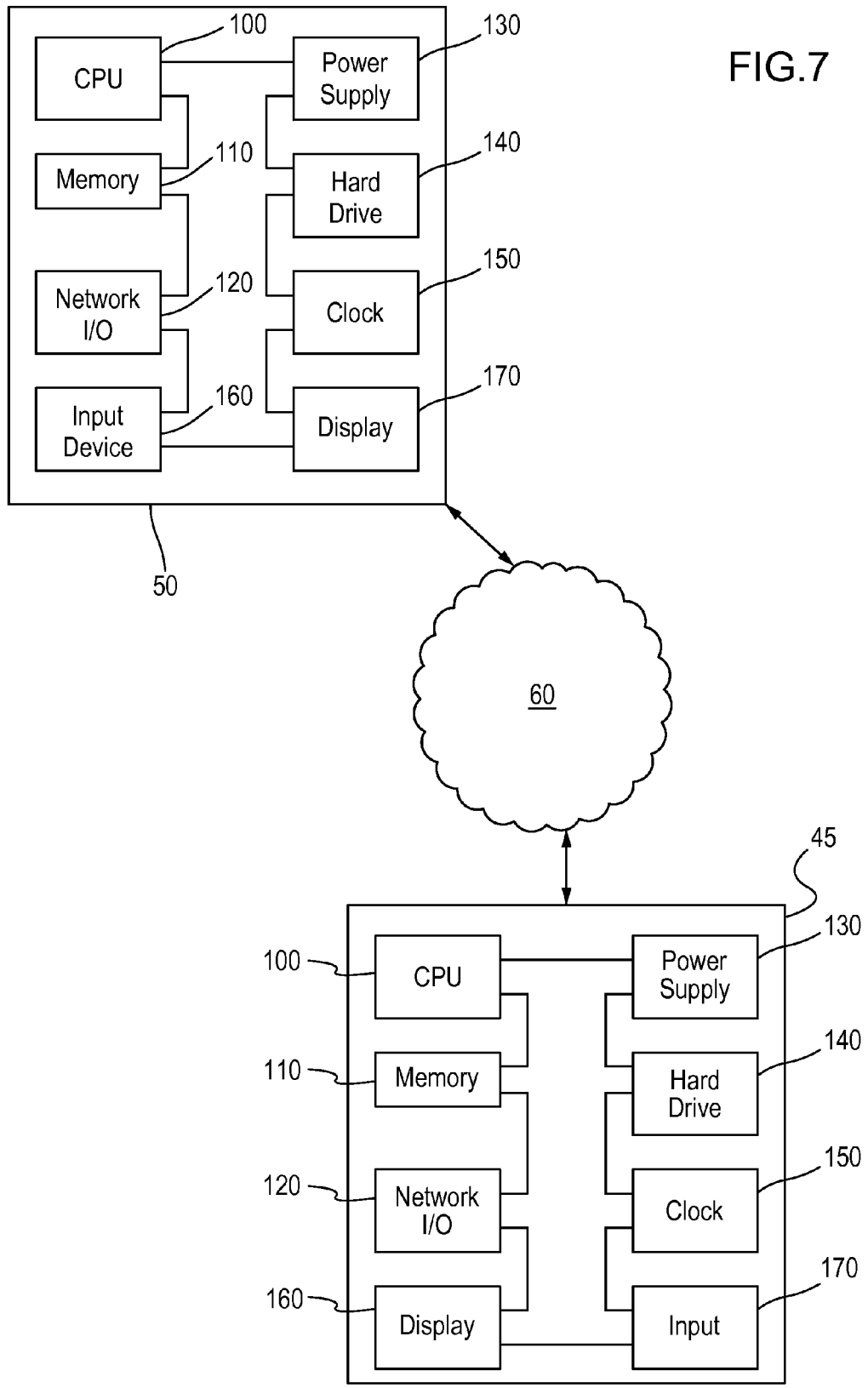
FIG. 7 illustrates a hardware diagram of components used in one embodiment of a content delivery system.

FIG. 7 shows an example of the hardware and interconnectivity between the server 50 and a client device 45. As shown in FIG. 7, server 50 can include a central processing unit (CPU) 100. CPU 100 can perform all of some of the computing processes required by server 50. Further CPU 100 is not limited to one processor but could be a plurality of processors which perform the processing duties.

CPU 100 is interconnected to memory 110. Memory 100 could be for example, random access memory (RAM) and could store information required by the CPU 100. CPU 100 and memory 110 can be interconnected to a network interface 120. Network interface 120 can facilitate communication between server 50 and other devices connected to network 60. Network interface 120 could connect to network 60 using any of a number of known communication methods.

Input device 160 can be a mouse, keyboard, etc., and is used to input data to the server. Power supply 130 powers the server. Hard drive 140 can provide a non-volatile memory for server 50. Clock 150 can be used by the CPU 100 and other devices and provides a fixed frequency of oscillation. Display 170 can be a liquid crystal display, plasma display, or any other suitable viewing display.

Client device 45 can contain similar units as described above in the server 50. Further, an input on a client device 45 may be a touch-screen or the like.

Network 60 can be a local area network (LAN), wide area network (WAN), or the Internet, for example.

ILLUSTRATIVE EXAMPLES

An example of how an embodiment of the content delivery determination system will be explained below. This example is illustrative of only a single embodiment and does not in any way limit the invention to the parameters and systems described below.

Example 1

A user using an IPHONE mobile device 20 loads a webpage which contains a URL. The URL provided on the webpage is the same URL provided for any client device. The user clicks on the URL. The URL is intended to direct the mobile device 20 to a media file so that the user may receive a video stream. The streamed video in this case is a live sporting event.

Once the URL is clicked by the user, the server 50 receives a request for the media content. Prior to delivering the media content to the mobile device 20, the server 50 determines which type of media file protocol to serve to the mobile device 20.

In this case, the server parses the user-agent string, which is present in the mobile device 20 making the media content request, and determines that the mobile device 20 is an IPHONE. Once it is determined that an IPHONE is making the request, the server determines the media file protocol to use to serve to the mobile device 20. In this case, the selected protocol is HLS (HTTP Live Streaming).

Next it is determined whether the mobile device 20 can natively interpret a multi-bitrate file, such as a SMIL file. In the present example, the selected protocol for the mobile device 20 is HLS (HTTP Live Streaming), which supports a SMIL file.

Once it is determined that the mobile device 20 can play a multi-bitrate file, such as a SMIL file, the server 50 generates a protocol-specific URL for the client to be directed to. In this case, the mobile device 20 is directed to the SMIL file by the URL link. The appropriate media file can then be downloaded/streamed by the mobile device 20 once the mobile device 20 selects the appropriate bitrate file.

Example 2

A user using an ANDROID platform mobile device 10 loads a webpage which contains a URL. The URL provided on the webpage is the same URL provided for any client device. The user clicks on the URL. The URL is intended to direct the mobile device 10 to a media file so that the user may stream a video.

Once the URL is clicked by the user, the server 50 receives a request for the media content. Prior to delivering the media content to the mobile device 10, the server 50 determines which type of media file protocol to serve to the mobile device 10. In this case, the mobile device 10 is attempting to stream the video along with several other mobile devices simultaneously from the server 50. The streamed video in this case is a pre-recorded television show.

Once the URL is clicked by the user, the server 50 receives a request for the media content. Prior to delivering the media content to the mobile device 10, the server 50 first determines which type of media file protocol to serve to mobile device 10.

In this case, the server 50 parses the user-agent string, which is present in the media content request, and determines that the device being used is an ANDROID phone. Once the device is known, the appropriate protocol to use is determined. In this case, it is determined that the ANDROID platform mobile device is version is 2.2 and so delivery of the media file via a FLASH player using the HTTP protocol is chosen for the mobile device 10. (If an ANDROID platform using an earlier version requested a media file, such as version 2.1 or less, then a real time streaming protocol media file (RTSP) could be provided, for example.)

Next, the server 50 determines if the mobile device 10 can support multi-bitrate streaming. In the present example, the media player of the mobile device 10 is FLASH, which supports multi-bitrate streaming, but does not support an SMIL file.

In this case, the server 50 builds a multi-bitrate playlist file.

Once the multi-bitrate playlist file is created, the server 50 generates a URL for the mobile device 10 to be directed to. In this case, what is served to the mobile device 10 is the multi-bitrate playlist file. The multi-bitrate playlist file was created in part by parsing the contents of an SMIL file.

The mobile device 10 can then select the appropriate bitrate media file and begin streaming the desired media content from the server 50.

Example 3

A user using an ANDROID platform mobile device 10 loads a webpage which contains a URL. The URL provided on the webpage is the same URL provided for any client device. The URL is embedded into the webpage and clicked by the user. The URL is intended to direct the mobile device 10 to a media file so that the user may stream a video.

Once the URL is clicked by the user, the server 50 receives a request for the media content. Prior to delivering the media content to the mobile device 10, the server 50 determines which type of media file protocol to serve to the mobile device 10. In this case, the mobile device 10 is attempting to stream the video along with several other mobile devices substantially simultaneously from the server 50. The streamed video in this case is a pre-recorded television show.

Once the URL is clicked by the user, the server 50 receives a request for the media content. Prior to delivering the media content to the mobile device 10, the server 50 first determines which type of media file protocol to serve to mobile device 10.

In this case, the server 50 parses the user-agent string, which is present in the media content request, and determines that the device being used is an ANDROID phone. Once the device is known, the appropriate protocol to use is determined. In this case, it is determined that the ANDROID platform mobile device is version is 2.1 and so delivery of the media file via RTSP (real time streaming protocol) is chosen for the mobile device 10.

Next, the server 50 determines if the mobile device 10 can support multi-bitrate streaming. In the present example, the media player of the mobile device 10 does not support multi-bitrate streaming. The server 50 then determines a proper bitrate based on the communication protocol. The server 50 can use an SMIL file to determine the available bitrate files to provide to the mobile device 10. For example, a high, medium and low bitrate file could be available to serve to the mobile device 10. In this case, the server 50 selects a file with a low bitrate to provide to the mobile device 10 because the bitrates for the high and medium bitrate files were higher than bitrate that mobile device 10 could support.

Once the appropriate file is selected, the server 50 generates a URL for the mobile device 10 to be directed to. In this case, what is served to the mobile device 10 is the low bitrate media file.

The mobile device 10 can then select the appropriate bitrate media file and begin streaming the desired media content from the server 50.

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

While embodiments of the present disclosure have been particularly shown and described with reference to exemplary embodiments thereof, it will be understood by those of ordinary skill in the art that various changes in form and details may be made therein without departing from the spirit and scope of the present invention as defined by the following claims.

I claim:

1. A method of providing media content from a server, said method comprising:
    providing a URL which allows access to media content by a client device; receiving a request from the client device for the media content corresponding to the URL;
    parsing a user-agent string in the request from the client device and determining an identification of the type of client device based on the user-agent string;
    determining an operating system of the client device requesting the media content;
    selecting a media content protocol to stream to the client device based on the determined operating system; and
    providing said client device a streaming media file based on the selected media content protocol,
    wherein the media content protocol is a streaming media protocol compatible with a plurality of client devices in the event that the server is not able to determine the identification of the client device, wherein the plurality of client devices comprises a first group of devices having a first encoded bitrate and a second group of devices having a second encoded bitrate, the first encoded bitrate is lower than the second encoded bitrate, and the streaming media protocol compatible with the plurality of client devices has the first encoded bitrate.

2. The method of claim 1, further comprising:
    generating a specific URL which directs the client device to the streaming media file when providing the appropriate type of streaming media file to said client device.

3. The method of claim 1, further comprising: determining whether the client device can support a multi-bitrate file.

4. The method of claim 3, wherein if the client device does not support a multi-bitrate file, the server selects an appropriate bitrate of the streaming media file for the client device to download.

5. The method of claim 3, further comprising:
    creating a multi-bitrate playlist of media files for said client device.

6. The method of claim 3, wherein if it is determined that a client device does not support a multi-bitrate file, selecting an appropriate bitrate file based on the selected media content file protocol.

7. The method of claim 3, wherein if it is determined that a client device does not support a multi-bitrate file, selecting an appropriate bitrate file based on a network connection bandwidth between the client device and the server.

8. The method of claim 1, wherein the determination of the operating system of the client device includes parsing a user-agent string of the client device making the request.

9. A server providing media content, said server comprising: a hardware processor configured to:
    provide a URL which allows access to media content by a client device;
    receive a request from the client device for the media content corresponding to the URL;
    parse a user-agent string in the request from the client device and determine an identification of the type of client device based on the user-agent string;
    determine an operating system of the client device requesting the media content;
    select a media content protocol to stream to the client device based on the determined operating system; and
    provide said client device a streaming media file based on the selected media content protocol,
    wherein the media content protocol is a streaming media protocol compatible with a plurality of types of client devices in the event that the processor is not able to determine the identification of the client device,
    wherein the plurality of types of client devices comprises a first group of devices having a first encoded bitrate and a second group of devices having a second encoded bitrate, the first encoded bitrate is lower than the second encoded bitrate, and the streaming media protocol compatible with the plurality of types of client devices has the first encoded bitrate.

10. The hardware processor of claim 9, further configured to:
    generate a specific URL which directs the client device to the streaming media file when providing the appropriate type of streaming media file to said client device.

11. The hardware processor of claim 9, further configured to:
    determine whether the client device can support a multi-bitrate file.

12. The hardware processor of claim 11, further configured to select an appropriate bitrate of the streaming media file for the client device to download if the client device does not support a multi-bitrate file.

13. The hardware processor of claim 11, further configured to create a multi-bitrate playlist of media files for said client device.

14. The hardware processor of claim 11, further configured to select an appropriate bitrate file based on the selected media content file protocol if it is determined that the client device does not support a multi-bitrate file.

15. The hardware processor of claim 11, further configured to select an appropriate bitrate file based on a network connection bandwidth between the client device and the server if it is determined that the client device does not support a multi-bitrate file.

16. The hardware processor of claim 9, wherein the determination of the operating system of the client device includes parsing a user-agent string of the client device making the request.

17. A system of providing media content from a server to a client, said system comprising:
    a server;
    a client device; and
    a network;
    said server comprising a central processing unit programmed to perform the following steps: provide a URL which allows access to media content by a client device;
    receive a request from the client device for the media content corresponding to the URL;
    parse a user-agent string in the request from the client device and determine an identification of the type of client device based on the user-agent string;
    determine an operating system of the client device requesting the media content;
    select a media content protocol to stream to the client device based on the determined operating system; and
    providing said client device a streaming media file based on the selected media content protocol,
    wherein the media content protocol is a default streaming media protocol compatible with a plurality of types of client devices in the event that the sever is not able to determine the identification of the client device,
    wherein the plurality of types of client devices comprises a first group of devices having a first encoded bitrate and a second group of devices having a second encoded bitrate, the first encoded bitrate is lower than the second encoded bitrate, and the streaming media protocol compatible with the plurality of types of client devices has the first encoded bitrate.

18. The system of claim 17, further comprising the central processing unit programmed to:
    generate a specific URL which directs the client device to the streaming media file when providing the appropriate type of streaming media file to said client device.

* * * * *